United States Patent
Park et al.

(10) Patent No.: US 11,393,075 B2
(45) Date of Patent: Jul. 19, 2022

(54) METHOD FOR GENERATING AN IMAGE THAT LIGHT NOISE IS REMOVED AND A DEVICE FOR GENERATING AN IMAGE USING THE METHOD THEREOF

(71) Applicant: SUPREMA ID INC., Seongnam-si (KR)

(72) Inventors: Bo Gun Park, Seoul (KR); Won Seok Ahn, Yongin-si (KR); Dae Hyun Kim, Seongnam-si (KR); Sang Won Lee, Anyang-si (KR)

(73) Assignee: SUPREMA ID INC., Seongnam-Si (KR)

( * ) Notice: Subject to any disclaimer, the term of this patent is extended or adjusted under 35 U.S.C. 154(b) by 0 days.

(21) Appl. No.: 17/337,288

(22) Filed: Jun. 2, 2021

(65) Prior Publication Data

US 2021/0374914 A1    Dec. 2, 2021

(30) Foreign Application Priority Data

Jun. 2, 2020    (KR) .................. 10-2020-0066295

(51) Int. Cl.
*G06T 5/00* (2006.01)
*G06K 9/62* (2022.01)
(Continued)

(52) U.S. Cl.
CPC ............ *G06T 5/002* (2013.01); *G06K 9/6215* (2013.01); *G06T 5/50* (2013.01); *G06V 10/22* (2022.01); *H04N 5/2256* (2013.01)

(58) Field of Classification Search
CPC ......... G06T 5/002; G06T 5/50; G06K 9/2054; G06K 9/6215; H04N 1/00766; H04N 1/04;
(Continued)

(56) References Cited

U.S. PATENT DOCUMENTS 6,088,612 A    7/2000 Blair
9,563,957 B1   2/2017 Choi
(Continued)

FOREIGN PATENT DOCUMENTS

CN    109118466 A  *  1/2019
DE    102014113256 A1   3/2016
(Continued)

OTHER PUBLICATIONS

Korean Office Action dated Mar. 3, 2021 as received in application No. 10-2020-0066295.
(Continued)

*Primary Examiner* — Mekonen T Bekele
(74) *Attorney, Agent, or Firm* — Maschoff Brennan

(57) ABSTRACT

Provided is an image generating device including a first lighting unit configured to emit light to an object, a second lighting unit configured to emit light to the object and located at a position different from a position of the first lighting unit, a light receiver configured to receive light reflected from the object when light is emitted to the object from the first lighting unit or the second lighting unit, and an image processor configured to obtain image data based on the light received by the light receiver and process the obtained image data, wherein the image processor obtains a first image based on light reflected from the object when light is emitted from the first lighting unit, obtains a second image based on light reflected from the object when light is emitted from the second lighting, generates a processed image by synthesizing the first image and the second image to correct a pixel value of a light noise region of the first image and/or the second image.

13 Claims, 9 Drawing Sheets

(51) Int. Cl.
*G06T 5/50* (2006.01)
*H04N 5/225* (2006.01)
*G06V 10/22* (2022.01)

(58) Field of Classification Search
CPC ............. H04N 1/19594; H04N 5/2256; G03G 15/011; G03G 15/043
See application file for complete search history.

(56) References Cited

U.S. PATENT DOCUMENTS

| | | | | |
|---|---|---|---|---|
| 9,832,436 | B1* | 11/2017 | Fuchikami | H04N 9/3185 |
| 10,607,077 | B1* | 3/2020 | Gottemukkula | G06K 9/00617 |
| 2008/0170800 | A1* | 7/2008 | Bergman | G06T 5/005 |
| | | | | 382/275 |
| 2010/0164883 | A1* | 7/2010 | Ahn | G06F 3/0412 |
| | | | | 345/173 |
| 2012/0057805 | A1* | 3/2012 | Hamada | H04N 5/2621 |
| | | | | 382/284 |
| 2013/0250123 | A1* | 9/2013 | Zhang | H04N 5/332 |
| | | | | 348/164 |
| 2014/0176595 | A1* | 6/2014 | Takahashi | G09G 5/02 |
| | | | | 345/590 |
| 2015/0086126 | A1* | 3/2015 | Senzaki | G06T 5/002 |
| | | | | 382/263 |
| 2017/0347076 | A1* | 11/2017 | Fuchikami | H04N 9/3164 |
| 2018/0061009 | A1* | 3/2018 | Gren | G06T 5/50 |
| 2020/0029808 | A1 | 1/2020 | MacDougall et al. | |

FOREIGN PATENT DOCUMENTS

| | | |
|---|---|---|
| JP | 2010-074725 A | 4/2010 |
| JP | 2017-103763 A | 6/2017 |
| JP | 2019-041233 A | 3/2019 |

OTHER PUBLICATIONS

European Search Report of European Patent Application No. 21177248.8, dated Oct. 22, 2021.

* cited by examiner

EXAMPLE OF 3D WEIGHT FUNCTION

FIG. 6
(a)
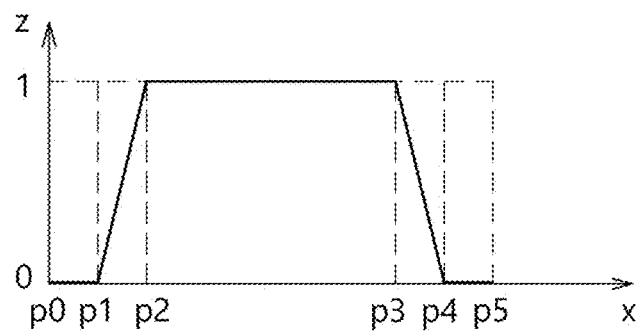
(b)
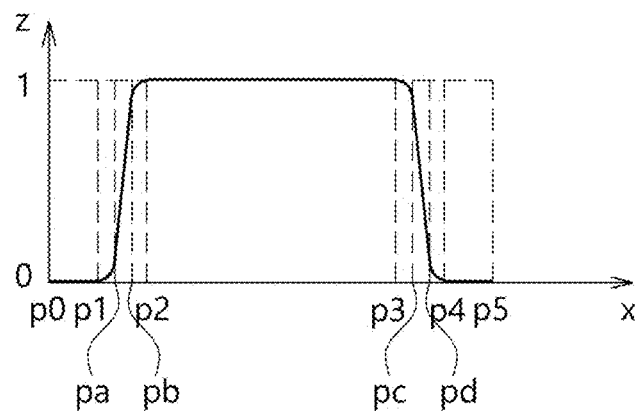

FIG. 9
(a)
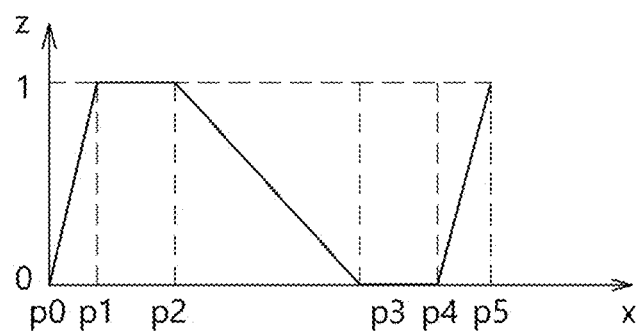
(b)
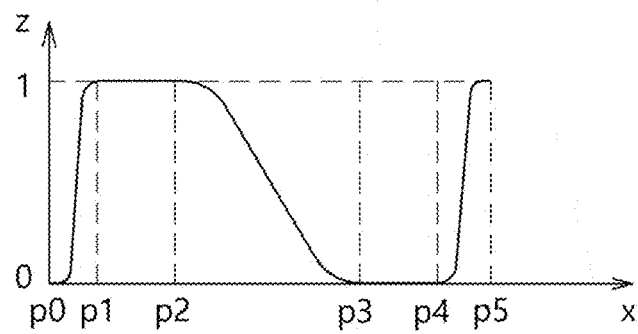

METHOD FOR GENERATING AN IMAGE THAT LIGHT NOISE IS REMOVED AND A DEVICE FOR GENERATING AN IMAGE USING THE METHOD THEREOF

CROSS-REFERENCE TO RELATED APPLICATIONS

The present application claims priority to Korean Patent Applications No. 10-2020-0066295, filed Jun. 2, 2021, the entire contents of which are incorporated herein for all purposes by this reference.

BACKGROUND

1. Field of the Invention

The present disclosure relates to a method of removing light noise, and more particularly, a method and device for setting an image synthesis region and a weight for removing light noise regions with respect to a plurality of images obtained using light emitted from a plurality of lighting devices and obtaining an image from which light noise is removed using the image synthesis region and the weight.

2. Discussion of Related Art

In Korea, an automatic immigration checkpoint was first set up in Incheon Airport in 2008, and about 170 automatic immigration checkpoints have currently been set up and are being operated in eight airports and ports. An automatic immigration checkpoint is an advanced immigration inspection system for checking identity when passport information and bio information are registered in advance with a device. When identity is checked on the basis of passport information, a personal data section of a passport put on a reader is scanned quickly and compared with registered passport information to determine whether a scanning result matches the passport information.

An automatic immigration inspection is faster and simpler than face-to-face inspection, but security blind spots should not be ignored in terms of identification and thus quick and accurate identification should be performed during the inspection.

However, generally, a surface of an identification certificate such as a passport or an identification card is coated with a transparent material for security and storage purposes. The transparent material may cause light noise in a scanned copy of the identification certificate due to a lighting device necessarily included in a scanner.

SUMMARY OF THE INVENTION

The present disclosure is directed to extracting an image of a region of an image in which light noise is generated.

The present disclosure is directed to obtaining an image synthesis region to naturally remove light noise from an image through an image synthesis.

The present disclosure is directed to obtaining a weight to be used to naturally remove light noise from an image through an image synthesis.

Provided is a device for generating an image, the device comprising: a first lighting unit configured to emit light to an object, a second lighting unit configured to emit light to the object and located at a position different from a position of the first lighting unit, a light receiver configured to receive light reflected from the object when light is emitted to the object from the first lighting unit or the second lighting unit, and an image processor configured to obtain image data based on the light received by the light receiver and process the obtained image data, wherein the image processor obtains a first image based on light reflected from the object when light is emitted from the first lighting unit, obtains a second image based on light reflected from the object when light is emitted from the second lighting unit, generates a processed image using the first image and the second image to correct a pixel value of at least one of a first light noise region of the first image due to the light emitted from the first lighting unit or a second light noise region of the second image due to the light emitted from the second lighting unit, wherein the processor, to generate the processed image, obtains a similarity between the first image and the second image, determines a weight function for synthesizing the first image and the second image on the basis of the similarity, and generates the processed image by synthesizing the first image and the second image on the basis of the weight function.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 6 is a diagram for describing a linear weight function and a sigmoid weight function on the basis of the first method according to an embodiment;

FIG. 9 is a diagram for describing synthesizing images using a weight function on the basis of the second method according to an embodiment.

DETAILED DESCRIPTION OF EXEMPLARY EMBODIMENTS

Figure 1:
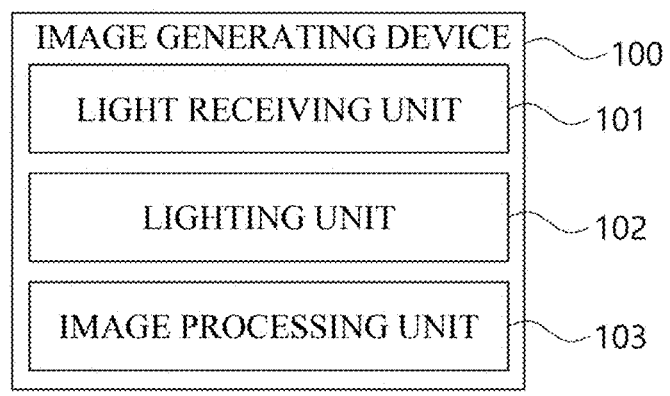
FIG. 1 is a configuration diagram of an image generating device for removing light noise from an image according to an embodiment.

Embodiments set forth herein are intended to explicitly explain the spirit of the present disclosure to those of ordinary skill in a technical field to which the present disclosure pertains, and thus, the present disclosure is not limited to these embodiments and the scope thereof should be understood as including modifications or changes made without departing from the spirit of the present disclosure.

In the present specification, general terms that are widely used nowadays are selected, when possible, in consideration of functions of the present disclosure, but non-general terms may be selected according to the intentions of those of ordinary skill in the art, precedents, or new technologies, etc. However, when specific terms are arbitrarily defined and used, the meanings thereof will be described separately. Thus, the terms used herein should be defined not based on the names thereof but based on the meanings thereof and the whole context of the present disclosure.

The drawings attached herein are provided to easily describe the present disclosure, in which elements may be exaggerated in size as needed to help understanding of the present disclosure and the present disclosure is not limited thereby.

In the following description, well-known functions or constructions are omitted as necessary if it is determined that they would obscure the present disclosure due to unnecessary detail.

According to the present application, provided is a device for generating an image, the device comprising: a first lighting unit configured to emit light to an object, a second lighting unit configured to emit light to the object and located at a position different from a position of the first lighting unit, a light receiver configured to receive light reflected from the object when light is emitted to the object from the first lighting unit or the second lighting unit, and an image processor configured to obtain image data based on the light received by the light receiver and process the obtained image data, wherein the image processor obtains a first image based on light reflected from the object when light is emitted from the first lighting unit, obtains a second image based on light reflected from the object when light is emitted from the second lighting unit, generates a processed image using the first image and the second image to correct a pixel value of at least one of a first light noise region of the first image due to the light emitted from the first lighting unit or a second light noise region of the second image due to the light emitted from the second lighting unit, wherein the processor, to generate the processed image, obtains a similarity between the first image and the second image, determines a weight function for synthesizing the first image and the second image on the basis of the similarity, and generates the processed image by synthesizing the first image and the second image on the basis of the weight function.

Wherein the first lighting unit and the second lighting unit are located at symmetrical positions with respect to the light receiver.

Wherein the device further comprising an object accommodation unit configured to accommodate the object, wherein the first light noise region is generated due to light emitted from the first lighting unit to a first region of the object accommodation unit, wherein the second light noise region is generated due to light emitted from the second lighting unit to a second region of the object accommodation unit, wherein a distance between the first lighting unit and the first region is shorter than a distance between the first lighting unit and the second region, and a distance between the second lighting unit and the second region is shorter than a distance between the second lighting unit and the first region.

Wherein the image processor obtains a first synthesis region including the first light noise region on the based on the first light noise region, and determines the weight function for generating the processed image on the basis of the similarity, a boundary of the first light noise region, and a boundary of the first synthesis region.

Wherein the image processor obtains a similarity between the first light noise region of the first image and the second light noise region of the second image.

Wherein the image processor obtains a similarity between a first region of the first image, which does not include the first light noise region, and a second region of the second image, which does not include the second light noise region.

Wherein the image processor obtains the weight function, based on the similarity, a boundary of a region of the first image and a boundary of a region of the second image, Wherein the region of the first image does not include the first light noise region and the region of the second image does not include the second light noise region.

Wherein the image processor obtains the weight function based on the similarity, a boundary of the first light noise region, and a boundary of the second light noise region.

Wherein the image processor determines the weight function to include a linear function when a value obtained based on the similarity is less than or equal to a predetermined value, and determines the weight function to include a sigmoid function when the value obtained based on the similarity is greater than the predetermined value.

Wherein the light receiver obtains image data including a pixel value on the basis of the reflected light and transmits the image data to the image processor, and the image processor obtains an image on the basis of the obtained image data.

Wherein the light receiver obtains first image data including a pixel value on the basis of light emitted to the object from the first lighting unit and transmits the first image data to the image processor, and obtains second image data including a pixel value on the basis of light emitted to the object from the second lighting unit and transmits the second image data to the image processor, and the image processor obtains the processed image on the basis of the first image data and the second image data.

Wherein the light receiver obtains first sub-image data corresponding to a predetermined first subregion of the object among the first image data and transmits the first sub-image data to the image processor when the first image data is obtained, and obtains second sub-image data corresponding to a predetermined second subregion of the object among the second image data and transmits the second sub-image data to the image processor when the second image data is obtained, and the image processor obtains the processed image on the basis of the first sub-image data and the second sub-image data.

According to the present application, provided is a method for generating an image, the method comprising: emitting light to an object using a first lighting unit, emitting light to the object using a second lighting unit disposed at a position different from a position of the first lighting unit, obtaining a first image based on light reflected from the object when the light is emitted from the first lighting unit, obtaining a second image based on light reflected from the object when the light is emitted from the second lighting unit, obtaining a similarity between the first image and the second image, determining a weight function for synthesizing the first image and the second image on the basis of the similarity, and generating a processed image by synthesizing the first image and the second image using the weight function to correct a pixel value of at least one of a first light noise region of the first image due to the light emitted from the first lighting unit or a second light noise region of the second image due to the light emitted from the second lighting unit.

According to the present application, provided is a computer program stored in a computer-readable recording medium and implemented to execute the above method.

An image generating device and method set forth herein are related to a technique for a device and method for removing light noise generated in an image due to a lighting device when the image is obtained by the device.

The light noise may be understood to mean that when an image is obtained by emitting light to an object such as a document and receiving light reflected from the document, a pixel value of a pixel of the image is a saturation value according to a material of the document, the intensity of light, the distance from the image to the lighting device, an orientation of the document, etc. Specifically, when the pixel value is greater than a predetermined threshold, the pixel value may be determined to be a saturation value.

Here, the threshold value serving as a reference to determine whether saturation occurs may be determined based on the largest pixel value among pixel values of pixels of an image obtained by emitting light to a full-white object and receiving light reflected from the object.

The lighting noise may refer to reflected light, glare, or a light blur. When a region of an image in which light noise is generated includes text or a photograph, information represented by the text or photograph may be unidentifiable due to the light noise. For example, when an image in which light noise is generated is an image obtained by photographing a passport and the light noise is generated in an image of the face of the owner of the passport in the obtained image, the face of the owner of the passport may not be possible to identify using the obtained image.

The image generating device may remove light noise generated in an image to generate an image in which information of text, a photograph, etc. included in the original document is identifiable. In addition, the image generating device may obtain an image close to an original document by removing light noise generated in the image. In some cases, when an image includes information and a photograph of a person that should be clearly displayed, the image generating device may remove light noise from the image to prevent a situation in which the information and the photograph of the person cannot be identified and recognized.

For example, an image of a certificate such as a passport, an identification card, or a driver's license may be obtained and used to check identity at an automatic immigration checkpoint at the airport. In this case, generally, a surface of the certificate may be coated with a transparent or smooth material for security and storage purposes. Therefore, when an image of the certificate is obtained using a lighting device for the purpose of identification, light noise may be generated in the image due to the reflection of light emitted from the lighting device to the object. In this case, the light noise generated in an image may be removed by correcting pixel values such as brightness, a color value, a chroma value, etc. to accurately check the identity of the owner of the document.

The image generating device according to an embodiment may include a plurality of lighting units and a light receiver. The plurality of lighting units may be located at different positions with respect to the light receiver. The plurality of lighting units may emit light to the same object at different points in time and obtain a plurality of pieces of image data on the basis of light reflected from the object. Light noise may be included in different positions in a plurality of images obtained based on the plurality of pieces of image data.

The image generating device may extract regions of the plurality of images in which the light noise is generated. The image generating device may set a synthesis region on the basis of the extracted regions, i.e., light noise regions. The image generating device may set a weight on the basis of the light noise regions and/or the synthesis region. Here, the weight may refer to a weight for correcting pixel values of the light noise regions and/or the synthesis region.

The image generating device may determine a form of weight function to be used for synthetization by comparing pixel values of pixels constituting the light noise regions.

Specifically, the image generating device may represent pixel values of each of a plurality of images in the form of a histogram. The image generating device may obtain a similarity by comparing histograms with each other. In addition, the image generating device may determine a form of weight to be used for synthetization according to the similarity and obtain a weight function on the basis of the form of weight. In this case, the form of weight function may be determined as a primary linear function, a sigmoid function, or a tanh function.

The image generating device may correct the pixel values of the light noise regions and/or the synthesis region by synthesizing the plurality of images using the obtained weight function. The image generating device may obtain an image from which a light noise region is removed by correcting the pixel values of the lighting noise regions and/or the synthesis region.

FIG. 1 is a configuration diagram of an image generating device for removing light noise from an image according to an embodiment.

Functions of components of the image generating device according to an embodiment will be described with reference to FIG. 1 below.

An image generating device 100 according to an embodiment may include a light receiving unit 101 for receiving light, a lighting unit 102 for emitting light to an object, and an image processing unit 103 for processing an image.

In order to obtain an image of an object, the light receiving unit 101 may receive light reflected from the object and generate and obtain an image on the basis of the received light or data about the image The light receiving unit 101 may include at least one of a digital image sensor, a camera, and a photosensor. The digital image sensor, the camera, and the photosensor may include a complementary metal-oxide semiconductor (CMOS) and a charge-coupled device (CCD). The light receiving unit 101 may receive light reflected from the object. The light receiving unit 101 may obtain data by receiving light reflected from the object and generate an image on the basis of the obtained data.

The light receiving unit 101 may generate and obtain an image corresponding to an entire region of the object on the basis of the light reflected from the object or data about the image. Alternatively, the light receiving unit 101 may generate and obtain an image corresponding to a region of the object on the basis of the light reflected from the object or data about the image. Here, the region may be understood as a left region or a right region of the object relative to the light receiving unit 101.

A time required for the light receiving unit 101 to generate and obtain an image may increase as the size of the image increases. Therefore, in the generating and obtaining of the image, the light receiving unit 101 may generate and obtain only a region of the image to be used for synthetization so as to reduce a time required to generate and obtain the image.

The light receiving unit 101 may include a processor. The light receiving unit 101 may generate an image based on the obtained data through the processor. The light receiving unit 101 may generate an image based on the obtained data through the processor and image-process the generated image. For example, the light receiving unit 101 may generate an image based on the obtained data and perform processing to extract only a region of the generated image.

The light receiving unit 101 may transmit data obtained by receiving light reflected from an object to the image processor 103. In addition, the light receiving unit 101 may transmit an image generated based on the obtained data to the image processor 103. Specifically, the light receiving unit 101 may transmit an image corresponding to an entire region of the object or data about the image to the image processor 103. Alternatively, the light receiving unit 101 may transmit an image corresponding to a region of the object or data about the image to the image processor 103.

A speed at which the data or the image is transmitted may be inversely proportional to the size of the data or image. Therefore, during the transmission of the image or the data about the image, a time required to process the image may be reduced when only an image of a region of the image to be used for synthetization or data about the image of the region is transmitted.

The light receiving unit 101 may be positioned such that a centerline thereof is aligned with a centerline of an object accommodation unit on which an object is placed. Alternatively, the light receiving unit 101 may be located such that the centerline thereof is aligned with a centerline between a plurality of lighting units 10.

The lighting unit 102 may include a light source to emit light to an object.

The lighting unit 102 may include at least one of a light-emitting diode (LED), an incandescent light, and a fluorescent light. In addition, the lighting unit 102 may include various types of light sources capable of emitting light to an object.

A plurality of lighting units 102 may be provided. The plurality of lighting units 102 may be provided at different positions. For example, when there are two lighting units 102, the two lighting units 102 may be provided at symmetrical positions with respect to the light receiving unit 101. For example, the two lighting units 102 may be located symmetrically on a left side and a right side of the light receiving unit 101. Therefore, light noise may be generated at different positions on a plurality of images obtained using the plurality of lighting units 102 by the image generating device 100.

The plurality of lighting units 102 may emit light to an object at different points in time for a certain time. Specifically, when the plurality of lighting units 102 include a first lighting unit and a second lighting unit, the second lighting unit may emit light to the object a certain time after the first lighting unit emits light to the object. Alternatively, the second lighting unit may emit to the object a certain time after the first lighting unit emits light to the object and the light receiving unit 101 receives light reflected from the object. Accordingly, the image generating device 100 may obtain a plurality of images of the same object for the certain time, in which light noise is generated at different positions.

One lighting unit 102 may include a plurality of light sources. For example, one lighting unit 102 may include a plurality of LEDs. As another example, the lighting unit 102 may include an array of a plurality of LEDs.

When the lighting unit 102 includes a plurality of light sources, the plurality of light sources may be turned on simultaneously or sequentially.

When the lighting unit 102 includes a first LED, a second LED, and a third LED and the three LEDs are arranged in a line parallel with a horizontal or vertical axis of an object, the image generating device 100 may control the first LED, the second LED, and the third LED to be sequentially turned on for a certain time so that the intensity of light emitted to the object along the horizontal or vertical axis may be uniformly dispersed. The higher the intensity of light, the larger an area in which light noise may be generated, therefore the image generating device 100 may control light sources to be sequentially turned on or off to reduce a light noise region.

According to an embodiment in which the plurality of light sources are turned on sequentially, when the lighting unit 102 includes an array of three light sources (a first light source, a second light source, and a third light source), the first light source, which is a leftmost light source, may be controlled to be first turned on and thereafter the second and third light sources may be controlled to be sequentially turned on. Alternatively, the first to third light sources may be turned on in an order in reverse from the above-described order.

Specifically, for example, the lighting unit 102 may include a first light source, a second light source, and a third light source, and the second light source may be controlled to be turned on while the first lighting unit is turned on and the third lighting unit may be controlled to be turned on while the first and second light units are turned on.

As another example, the lighting unit 102 may include a first light source, a second light source, and a third light source and may be controlled such that the second light source is turned on when the first light source is turned on and thereafter is turned off or after the first light source is turned off and the third light source is turned on and thereafter is turned off when or after the second light source is turned off.

Here, the plurality of light sources included in the lighting unit 102 may be arranged in various arrays such as a one-dimensional array or a two-dimensional array. The image generating device 100 may control an order in which the plurality of light sources of the lighting unit 102 are turned on or off, a time during which each of the plurality of light sources is turned on or off, and the plurality of light sources to have various brightness levels.

The image processing unit 103 may generate or obtain an image on the basis of light reflected from an object and perform an operation of removing light noise from the image.

The image processing unit 103 may include at least one processor. The image processing unit 103 may receive data obtained by receiving light reflected from an object by the light receiver 102 or receive an image generated based on the data. When receiving the data obtained by receiving the light from the light receiver 102, the image processing unit 103 may generate an image based on the data.

The image processing unit 103 may remove light noise generated in the generated or obtained image. Specifically, the image processing unit 103 may extract lighting noise regions generated in a plurality of generated or obtained images. The image processing unit 103 may obtain a weight function based on the extracted light noise regions. In addition, the image processing unit 103 may remove light noise by synthesizing a plurality of images using the obtained weight function.

A first image and a second image to be described below are defined as a plurality of images of the same object which are generated or obtained by the light receiving unit 101 or the image processor 103. The first image is defined as an image obtained by receiving light reflected from an object to which light is emitted from the first lighting unit located on the left side of the light receiving unit 101, and the second image is defined as an image obtained by receiving light reflected from the object to which light is emitted from the second lighting unit located on the right side of the light receiving unit 101. However, as described above, the number of the plurality of lighting units is not limited to two, and three or more lighting units may be provided. The first lighting unit and the second lighting unit described herein may be respectively differently located on a left region and a right region with respect to the light receiving unit 101 and are not necessarily limited to the left and right sides of the light receiving unit 101, which are on the same line.

The image processing unit 103 may remove light noise through local or global synthetization based on an extracted light noise region.

The image processing unit 103 may remove light noise generated in a first image by locally synthesizing the first image with a region of a second image, which is located at a position corresponding to a position of the light noise generated in the first image, according to a first method. Specifically, the image processing unit 103 may obtain the first image from which the light noise is removed by synthesizing the first image with the region of the second image, which is located at the position corresponding to the position of the light noise generated in the first image, using a weight function obtained based on the light noise generated in the first image. In addition, the image processing unit 103 may obtain the second image from which light noise is removed by the above-described method of removing the light noise in the first image.

The image processing unit 103 may obtain the weight function for synthesizing the first image and the second image according to the first method. A method of obtaining the weight function will be described in detail below.

The image processing unit 103 may obtain a third image using the first image and the second image from which the light noise is removed by the first method. Specifically, the third image may be obtained by synthesizing an image of a left region of the first image from which the light noise is removed and an image of a right region of the second image from which the light noise is removed. Because the first image was obtained using the first lighting unit located at the left side of the light receiving unit 101, a brightness level of the right region of the first image may be lower than that of the left region of the first image. Thus, the image processing unit 103 is configured to remove light noise generated in an image so that information of text, a photograph, etc. included in the image may be more accurately identified, and thus the image processing unit 103 may obtain the third image, which has a uniform brightness level and includes identifiable information, by extracting only a left region having a relatively high brightness level and thus including identifiable information from an entire region of the first image and extracting only a right region having a relatively high brightness level and thus including identifiable information from an entire region of the second image and thereafter synthesizing images of the extracted regions.

The image processing unit 103 may obtain a third image from which light noise is removed by a second method using a region of a first image in which no light noise or a small amount of light noise is generated and a region of a second image in which no light noise or a small amount of light noise is generated. Specifically, each of the right region of the first image and the left region of the second image may include no light noise or a small amount of light noise that does not affect identification of information included therein when a distance to a lighting unit is taken into consideration. Therefore, the image processing unit 103 may obtain the third image from which the light noise is removed using the right region of the first image and the left region of the second image by the second method.

The image processing unit 103 may obtain the weight function for synthesizing the first image and the second image by the second method. A method of obtaining the weight function will be described in detail below.

The left and right regions of each of the first and second images described above are not limited to a left region and a right region thereof with respect to a centerline of each of the first and second images, and the left region may further include a right region of the first or second image with respect to the centerline and the right region may further include a left region of the first or second image with respect to the centerline.

A process of generating an image from which light noise is removed by synthesizing a plurality of images obtained by an image generating device will be described in detail with reference to FIGS. 2 to 9 below.

Figure 2:
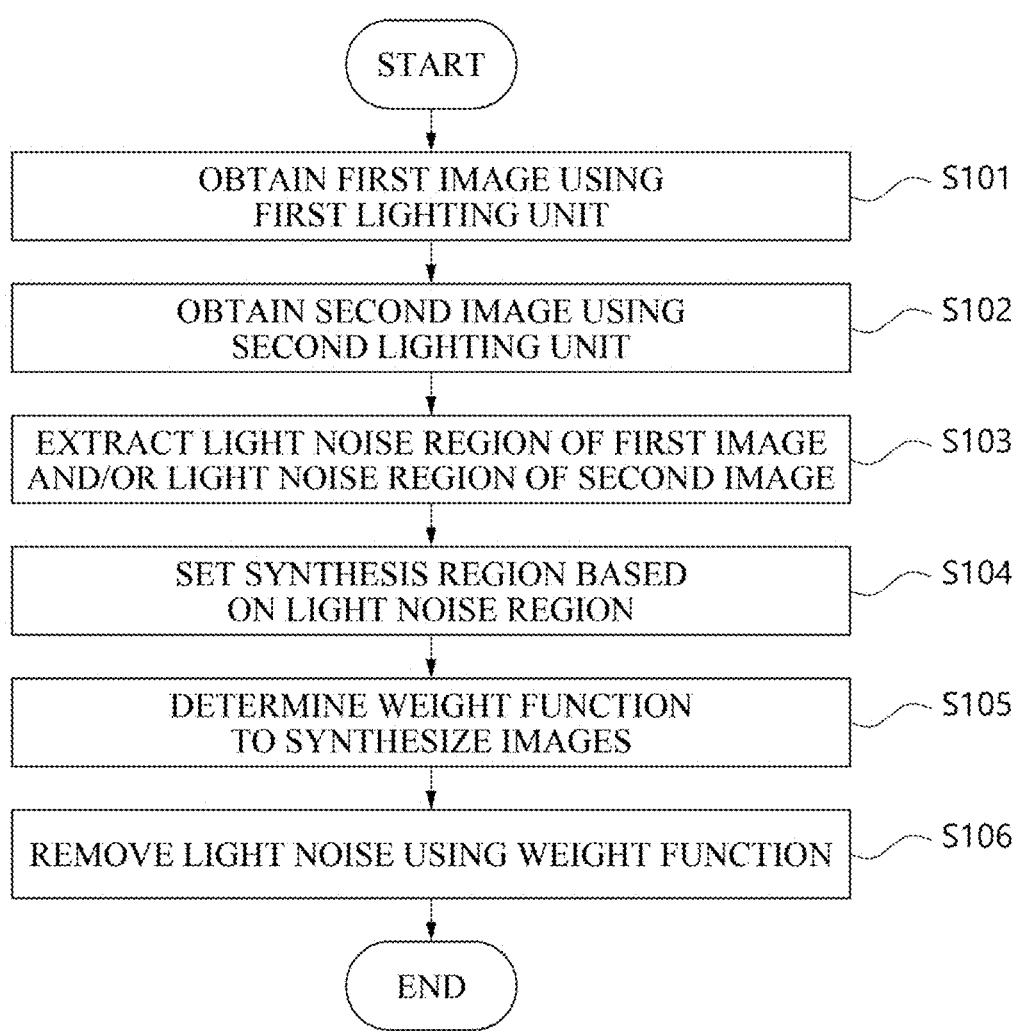
FIG. 2 is a flowchart of a process of removing light noise according to an embodiment.

FIG. 2 is a flowchart of a process of removing light noise according to an embodiment.

Referring to FIG. 2, according to an embodiment, a method of generating an image that light noise is removed may include obtaining a first image using a first lighting unit (S101), obtaining a second image using a second lighting unit (S102), extracting a light noise region of the first image and/or a light noise region of the second image (S103), setting one or more synthesis region on the basis of the light noise region of the first image and/or the light noise region of the second image (S104), determining a weight function to synthesize images (S105), and removing light noise using the weight function (S106).

The above operations will be described in detail with reference to FIGS. 3 to 9 below.

Figure 3:
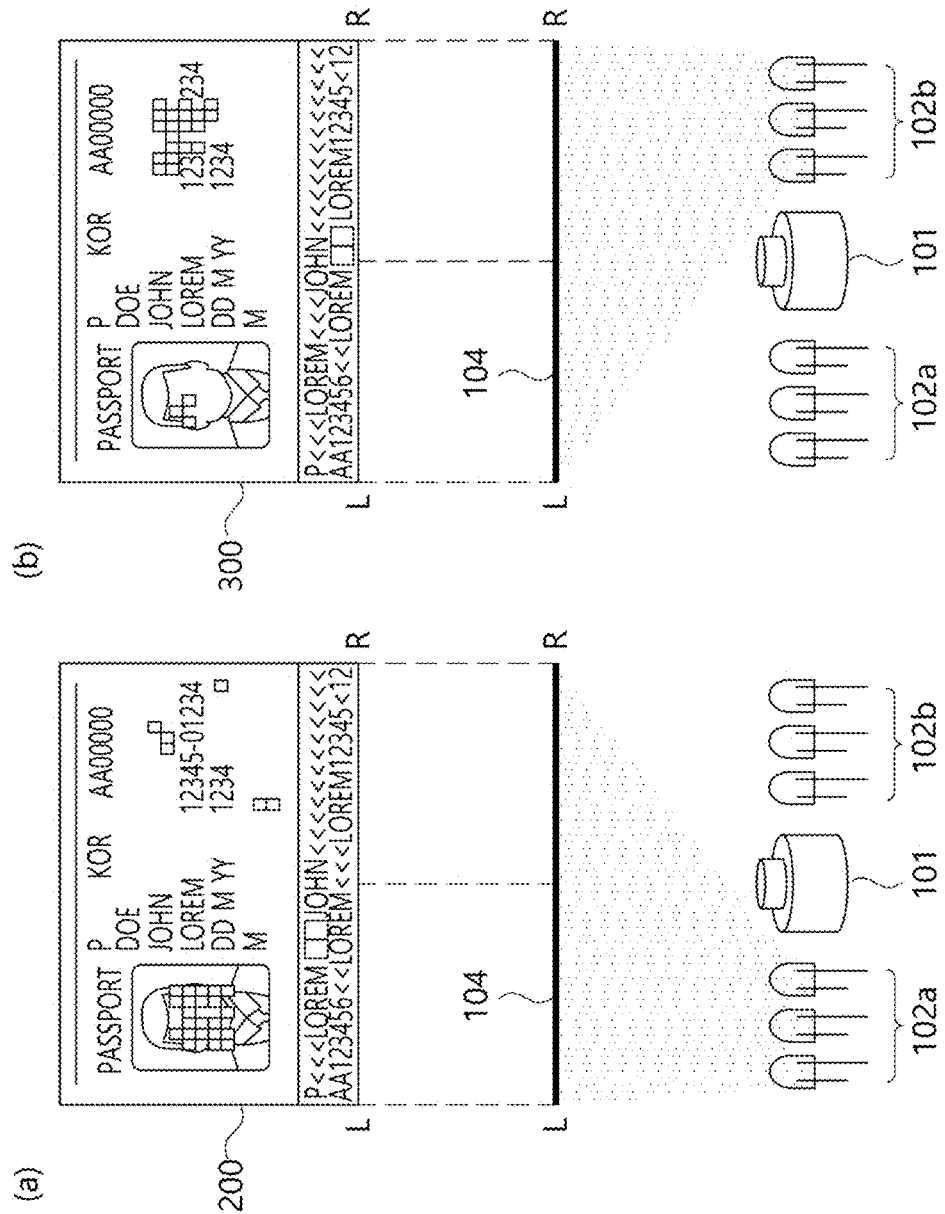
FIG. 3 is a diagram for describing obtaining a first image and a second image according to an embodiment.

FIG. 3 is a diagram for describing obtaining a first image and a second image according to an embodiment.

Referring to FIG. 3, according to an embodiment, in obtaining a first image using a first lighting unit, an image generating device 100 may receive light reflected from an object and obtain a first image 200 on the basis of the received light.

Specifically, a first lighting unit 102*a* may emit light to an object, and a light receiving unit 101 may receive light reflected from the object to obtain data serving as a basis of the first image 200. Here, the light receiving unit 101 may obtain the data serving as the basis of the first image 200 to generate the first image 200. Alternatively, the light receiving unit 101 may obtain the data serving as the basis of the first image 200 and transmit the data to the image processor 103, and the image processing unit 103 may generate the first image 200 using the received data.

The image generating device 100 may receive light reflected from the object when the object is placed on an object accommodation unit 104. Specifically, the image generating device 100 may detect the placing of the object on the object accommodation unit 104, control the first lighting unit 102*a* to emit light to the object, and receive light reflected from the object.

Alternatively, the image generating device 100 may receive light reflected from the object according to an operation of the first lighting unit 102*a*. Specifically, the image generating device 100 may receive light reflected from the object a certain time after the first lighting unit 102*a* emits light to the object.

The image generating device 100 may generate or obtain only an image of a left or right region of the object using the first lighting unit 102a. In addition, the image generating device 100 may generate or obtain the first image 200 using the first lighting unit 102a and process the generated or obtained first image 200 to cut only a left or right region thereof.

Referring to FIG. 3, according to an embodiment, in obtaining a second image using a second lighting unit, an image generating device 100 may receive light reflected from the object and obtain a second image on the basis of the received light.

Specifically, a second lighting unit 102b may emit light to the object, and the light receiving unit 101 may receive light reflected from the object to obtain data serving as a basis of the second image 300. Here, the light receiving unit 101 or the image processing unit 103 may obtain the data serving as the basis of the second image 300 to generate the second image 300.

In this case, the second lighting unit 102b may be located at a position different from a position of the first lighting unit 102a. Here, a distance between the light receiving unit 101 and the first lighting unit 102a may be the same or substantially the same as a distance between the light receiving unit 101 and the second lighting unit 102b. The first lighting unit 102a and the second lighting unit 102b may be symmetrical about the light receiving unit 101.

In the present specification, the second image 300 obtained using the second lighting unit 102b refers to an obtained image of the same object as the first image 200.

Here, the second image 300 obtained using the second lighting unit 102b may be an image of the same object as the first image 200 which is obtained a certain time before or after the first image is obtained. When the second image 300 is an image obtained after the first image 200 is obtained, the image generating device 100 may obtain the second image 300 according to an operation of the first lighting unit 102a.

According to an embodiment, the image generating device 100 may generate or obtain the second image 300 using the second lighting unit 102b a certain time after the first lighting unit 102a is turned off. Alternatively, the image generating device 100 may generate or obtain the second image 300 using the second lighting unit 102b a certain time after the first image 200 is obtained or generated.

According to another embodiment, the image generating device 100 may detect placement of an object on the object accommodation unit 104, control the first lighting unit 102a to emit light to an object a first time after the placement of the object is detected, receive light reflected from the object, control the second lighting unit 102b to emit light to an object a second time after the placement of the object is detected, the second time is longer than the first time, and receive light reflected from the object.

According to another embodiment, the image generating device 100 may receive light reflected from the object according to an operation of the second lighting unit 102b. Specifically, the image generating device 100 may receive light reflected from the object within a certain time after the first lighting unit 102a emits light to the object.

The image generating device 100 may generate or obtain only an image of a left or right region of the object using the second lighting unit 102b. In addition, the image generating device 100 may generate or obtain the second image 300 using the second lighting unit 102b and process the generated or obtained second image 300 to cut only a left or right region thereof.

The image generating device 100 may use only a region of an image according to a method of removing light noise. For example, when light noise is generated in a left region of the image, the image generating device 100 may use the left region in which the light noise is generated to synthesize images so as to remove the light noise.

Alternatively, when light noise is generated in the left region of the image, the image generating device 100 may use a right region of the image in which no light noise is generated to synthesize images so as to remove the light noise.

Figure 4:
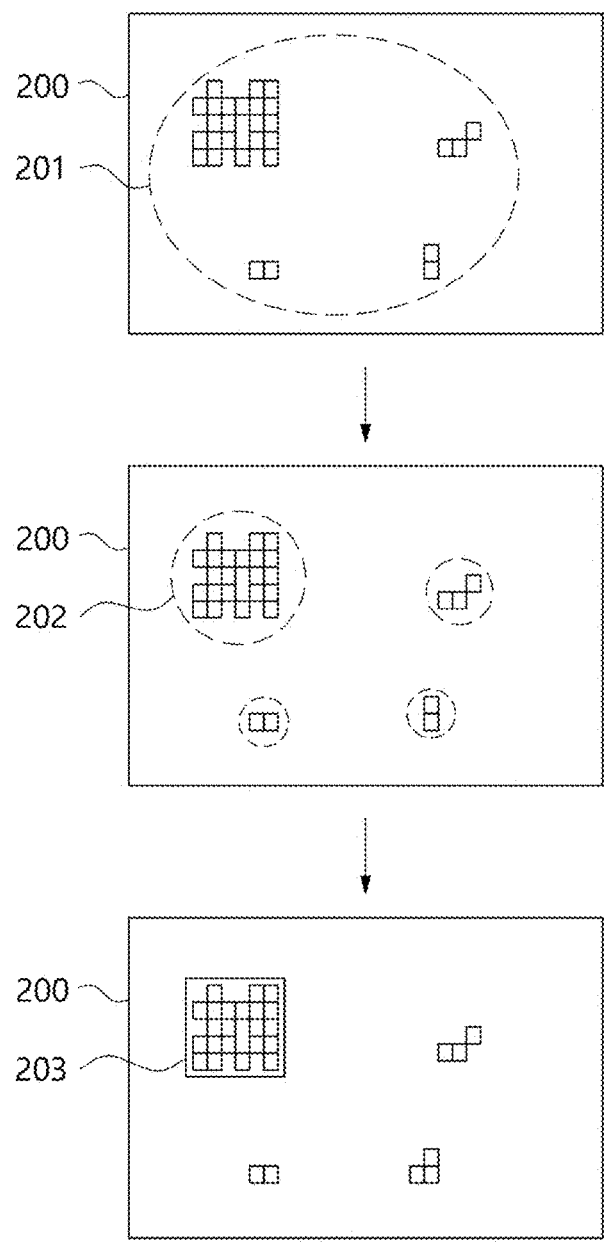
FIG. 4 is a diagram for describing extracting a light noise region according to an embodiment.

FIG. 4 is a diagram for describing extracting a light noise region according to an embodiment.

Referring to FIG. 4, according to an embodiment, in extracting a light noise region of a first image 200 and/or a light noise region of a second image 300, the image generating device 100 may extract, as a light noise region 203, a region of the first image 200 and/or the second image 300 in which light noise is generated (S103). Specifically, the image generating device 100 may extract a region of an image including a pixel in which the light noise is generated as the light noise region 203 from the first and/or second images 200 and 300.

A method of extracting the light noise region 203 described below with reference to FIG. 4 may apply to both the first image 200 and the second image 300, and a method of extracting a light noise region of the first image 200 will be described below.

As described above, when a pixel value is greater than a predetermined threshold, the pixel value may be determined to be a saturation value.

Here, the threshold value serving as a reference to determine whether saturation occurs may be determined based on a largest pixel value among pixel values of pixels of an image obtained by emitting light to a full-white object and receiving light reflected from the object.

When a threshold serving as a reference to determine whether light noise is generated is determined, the image generating device 100 may extract pixels having a pixel value greater than the threshold as light noise pixels 201 in which light noise is generated.

When the threshold is determined, the image generating device 100 may extract pixels having a brightness level greater than the threshold as the light noise pixels 201 in which light noise is generated.

The image generating device 100 may extract, as light noise pixels 201, a pixel value of a pixel of a red channel (hereinafter referred to as IR), which is greater than or equal to a threshold pixel value of the red channel (hereinafter referred to as Rth), a pixel value of a pixel of a green channel (hereinafter referred to as IG), which is greater than or equal to a threshold pixel value of the green channel (hereinafter referred to as Gth), and a pixel value of a blue channel (hereinafter referred to as IB), which is greater than or equal to a threshold pixel value of the blue channel (hereinafter referred to as Bth) with respect to an obtained image.

Specifically, the image generating device 100 may extract, as light noise pixels 201, pixels of the obtained image, which satisfy at least one or all of IR≥Rth, IR>Rth, IG≥Gth, IG>Gth, IB≥Bth, and IB>Bth. Here, as an object becomes closer to a lighting unit, the intensity of light emitted to the object increases and thus a large number of light noise pixels 201 may be extracted from a left region of the first image 200 obtained using the first lighting unit 102 located at the left side of the light receiving unit 101. A large number of light noise pixels 201 may be extracted from a right region of the second image 300 obtained using the second lighting unit 102 located at a right side of the light receiving unit 101.

Referring to FIG. 4, according to an embodiment, the image generating device 100 may perform clustering on the light noise pixels 201. Here, the clustering may refer to an image processing technique for classifying some pixels having the same characteristic value or substantially the same characteristic values among a plurality of pixels as a pixel set. Here, the characteristic values may refer to color values IR, IG, and IG of a RGB channel of pixels. Alternatively, the characteristic values may refer to a brightness level and a chroma level of a pixel.

Specifically, the image generating device 100 may extract pixels satisfying IR>Rth, IG>Gth and IB>Bth among all pixels of one image as light noise pixels 201 and classify pixels that are within a certain range among the light noise pixel 201 as a pixel set through clustering.

Here, the image generating device 100 may perform the clustering using an algorithm such as K-means clustering or the mean shift Gaussian mixture model. However, a method of performing the clustering is not limited to the above-described algorithms and all general algorithms used in the field of image processing are applicable.

Pixels of an image may be classified into a pixel set or multiple pixel sets as described above.

Here, when there is a pixel set classified through clustering, the image generating device 100 may perform a process for removing light noise with respect to the pixel set.

When there are multiple pixel sets classified through clustering, the image generating device 100 may perform a process of removing light noise with respect to a pixel set 202 including a largest number of pixels among the multiple pixel sets.

In general, a pixel set including a largest number of pixels or having a larger area among clustered pixel sets 202 may be a factor interfering with identification of information of text, a photograph, etc. included in the image, and thus, it may be efficient to perform the process of removing light noise only with respect to a pixel set 202 including a largest number of pixels or having a largest area among pixel sets classified through clustering.

When there are multiple pixel sets classified through clustering, the image generating device 100 may perform the process of removing light noise with respect to a pixel set 202 having a largest area among the multiple pixel sets.

Alternatively, when there are multiple pixel sets classified through clustering, the image generating device 100 may perform the process of removing light noise with respect to a pixel set 202 having an area greater than or equal to a certain area among the multiple pixel sets.

The image generating device 100 may approximate a shape of a boundary of the pixel set 202 to set a light noise region 203. Generally, a boundary of a region in which light noise is generated may have an irregular shape. Therefore, the shape of the boundary of the pixel set 202 may be approximated to a region having a shape similar to a shape of a region in which light noise is generated or a region having a certain shape such as a tetragonal, triangular, circular, or polygonal shape.

For example, the image generating device 100 may extract the boundary of the region in which light noise is generated using a convex hull algorithm and perform the approximation according to a method of extracting a minimum bounding box on the basis of the boundary.

For example, when a shape of a boundary of outer sides of the pixel set 202 including a pixel in which light noise is generated becomes similar to a rectangular shape through the approximation, the image generating device 100 may set a region of an image having, as a boundary, a rectangle including some or all of the pixel sets 202 and having an area similar to a total area of the pixel sets 202 as the light noise region 203.

As described above, a method of extracting or setting the light noise region 203 of the first image 200 may be used as a method for extracting or setting a light noise region 303 of the second image 300 according to the same operation. In addition, the light noise region 303 of the second image 300 is likely to be a right region of the second image 300 as described above.

A first method of removing light noise and a second method of removing light noise will be described separately below.

The first method refers to a method of removing light noise by locally synthesizing images with respect to a region in which the light noise is generated.

The second method refers to a method of removing light noise by globally synthesizing images with respect to an entire region of an image in which the light noise is generated.

The first method and the second method are different in terms of a method of determining a weight function to be used to synthesize images so as to remove light noise. Therefore, a method of removing light noise by the image generating device 100 according to the first method will be described with reference to FIGS. 5 to 7, and a method of removing light noise by the image generating device 100 according to the second method will be described with reference to FIGS. 8 and 9, focusing on the differences from the method of FIGS. 5 to 7.

In the description of the second method with reference to FIGS. 8 and 9, the same reference numerals are used to indicate the same components as in the description of the first method with reference to FIGS. 5 to 7, and reference numerals denoting differently defined terms and different components will be described separately in the description of FIGS. 8 and 9.

A method of locally removing light noise according to the first method will be described with respect to the method of removing the light noise of the first image 200 with reference to FIGS. 5 to 7 below. The method may also apply to removing light noise from the second image 300.

Figure 5:
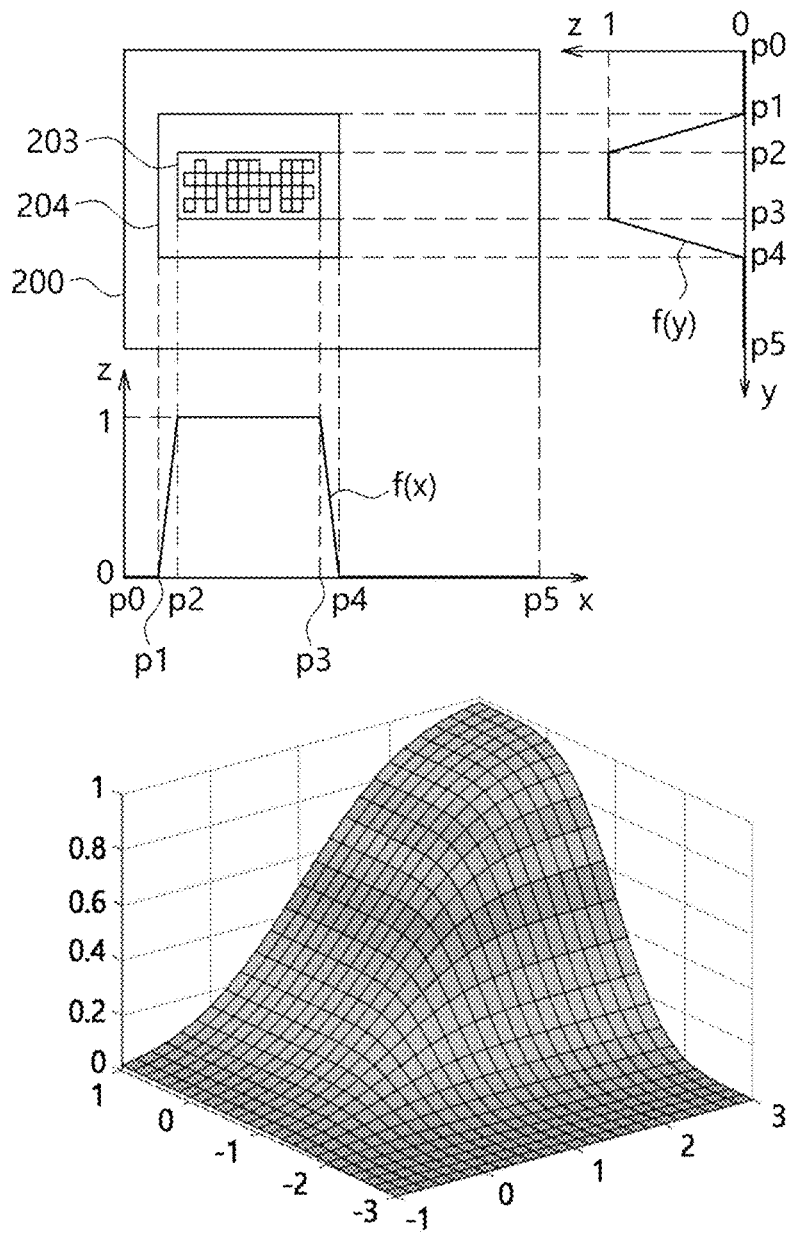
FIG. 5 is a diagram for describing setting a synthesis region and determining a weight function based on the synthesis region on the basis of a first method according to an embodiment.

FIG. 5 is a diagram for describing setting a synthesis region and determining a weight function on the basis of the synthesis region according to an embodiment.

Referring to FIG. 5, an image generating device may set a synthesis region for local synthesis on the basis of a light noise region (S104).

A first synthesis region 204 may refer to a region set based on a first light noise region 203 for synthesis for removing light noise.

Because the first image 200 and the second image 300 of the same object are obtained using the first lighting unit 102a and the second lighting unit 102b located at different positions, a brightness level of a left region of the first image 200 and a brightness level of a left region of the second image 300 may be different from each other.

In order to remove light noise from the first image 200, when a synthetic image is obtained by synthesizing the original first image 200 with a region of the second image 300 located at a position corresponding to a light noise region of the first image 200, a boundary line of the light noise region 203 may appear in the synthetic image due to the difference between the brightness level of the left region of the first image 200 and the brightness level of the left region of the second image 300.

In this case, the appearance of the boundary line may be prevented by setting a synthesis region wider than a light noise region and setting a weight function to gradually change a pixel value from a pixel value of a first image to a pixel value of a second image from a boundary of the light noise region to a boundary of the synthesis region.

Specifically, the image generating device 100 may set the first synthesis region 204 based on the first light noise region 203 and determine a weight function such that a pixel value of a pixel located in a region between the boundary of the first light noise region 203 and the boundary of the first synthesis region 204 is equal to the sum of a certain ratio between the pixel value of the first image 200 and the pixel value of the second image 300. For example, the weight function may be determined such that the pixel value of the pixel located in the region between the boundary of the first light noise region 203 and the boundary of the first synthesis region 204 is equal to (pixel value of first image)*0.7+(pixel value of second image)*0.3=(pixel value of synthetic image). When moved from the boundary of the first synthesis region 204 to the boundary of the first light noise region 203, the image generating device 100 may determine the weight function such that a pixel value is gradually changed from the pixel value of the first image 200 to the pixel value of the second image 300. Thus, the image generating device 100 may generate an image from which light noise is removed through a natural synthesis.

The image generating device 100 may set the first synthesis region 204 based on the light noise region 203 set in the first image 200.

Here, the image generating device 100 may set the first synthesis region 204 to include the light noise region 203.

Alternatively, the image generating device 100 may set the first synthesis region 204 to have the same shape as, or a shape substantially the same as, the light noise region 203.

Alternatively, the image generating device 100 may be set such that an area of the first synthesis region 204 is a certain percentage of an area of the light noise region 203. For example, the area of the first synthesis region 204 may be set to be 1.5 times the area of the light noise region 203.

Alternatively, the image generating device 100 may set the boundary of the first synthesis region 204 to be spaced a certain distance from the boundary of the light noise region 203.

Alternatively, the image generating device 100 may be set such that the first synthesis region 204 and the light noise region 203 have the same center point.

Referring to FIG. 5, according to an embodiment, the image generating device 100 may obtain a weight function based on a synthesis region for a local synthesis according to the first method (S105).

The image generating device 100 may determine weight functions f(x) and f(y) for a local synthesis according to the first method based on the light noise region 203 of the first image 200 in which light noise is generated and the first synthesis region 204. A reference and method for setting a weight function will be described with reference to f(x) below but may also apply to f(y) and f(x,y).

An x-axis of the weight function f(x) may represent the positions of pixels on a horizontal axis or a vertical axis of the first image 200. A z-axis of the weight function f(x) may represent a weight. In this case, the weight may be in a range of 0 to 1.

For convenience of description, the boundary of the first image 200 in FIG. 5 is marked as p0 and p5 on the x-axis of the weight function f(x). A boundary between the first synthesis region 204 and a region in which light noise is not generated is marked as p1 and p4 in the x-axis of the weight function f(x). A boundary between the first synthesis region 204 and the light noise region 203 is marked as p2 and p3 on the x-axis of the weight function f(x).

In an embodiment, a pixel value function F(x) of an image synthesized using the weight function f(x) may be expressed by Equation 1 below.

$$F(x)=(1-f(x))*A+f(x)*B \qquad \text{[Equation 1]}$$

Here, "A" may represent a pixel value of the first image 200 and "B" may represent a pixel value of the second image 300.

The image generating device 100 may set a function value f(x) of the weight function to 0 at $p0 \leq x \leq p1$ and $p4 \leq x \leq p5$ (or $p0<x<p1$ and $p4<x<p5$) corresponding to the region in which light noise is not generated. The image generating device 100 may multiply the pixel value of the first image 200 located at $p0 \leq x \leq p1$ and $p4 \leq x \leq p5$ (or $p0<x<p1$ and $p4<x<p5$) by a weight of $1-f(x)=1$ ($\because f(x)=0$) according to Equation 1. In addition, the image generating device 100 may multiply the pixel value of the second image 300 located at $p0 \leq x \leq p1$ and $p4 \leq x \leq p5$ (or $p0<x<p1$ and $p4<x<p5$) by a weight of $f(x)=0$ according to Equation 1. Therefore, the image generating device 100 may set a weight function so that a pixel value of a synthetic image located at $p0 \leq x \leq p1$ and $p4 \leq x \leq p5$ (or $p0<x<p1$ and $p4<x<p5$) becomes equal to the pixel value of the first image 200.

The image generating device 100 may set a function value f(x) of a weight function to include a value between 0 and 1 at $p1 \leq x \leq p2$ and $p3 \leq x \leq p4$ (or $p1<x<p2$ and $p3<x<p4$) corresponding to the region between the boundary of the first synthesis region 204 and the boundary of the light noise region 203. Accordingly, the image generating device 100 may multiply the pixel value of the first image 200 located at $p1 \leq x \leq p2$ and $p3 \leq x \leq p4$ (or $p1<x<p2$ and $p3<x<p4$) by a weight of $0<1-f(x)<1$ ($\because 0<f(x)<1$) according to Equation 1. In addition, the image generating device 100 may multiply the pixel value of the second image 300 located at $p1 \leq x \leq p2$ and $p3 \leq x \leq p4$ (or $p1<x<p2$ and $p3<x<p4$) by a weight of $0<f(x)<1$ according to Equation 1. Therefore, the image generating device 100 may determine a weight function such that a pixel value of a first image and a pixel value of a second image are reflected at a certain ratio in a pixel value of a synthetic image.

The image generating device 100 may set the function value f(x) of the weight function to include 1 at $p2 \leq x \leq p3$ (or $p2<x<p3$) corresponding to the light noise region 203. The image generating device 100 may multiply the pixel value of the first image 200 located at $p2 \leq x \leq p3$ (or $p2<x<p3$) by a weight of $1-f(x)=0$ ($\because f(x)=1$) according to [Equation 1]. The image generating device 100 may multiply the pixel value of the second image 300 located at $p2 \leq x \leq p3$ (or $p2<x<p3$) by a weight of $f(x)=1$ according to [Equation 1]. Therefore, the image generating device 100 may set a weight function such that a pixel value of a synthetic image located at $p0 \leq x \leq p1$ and $p4 \leq x \leq p5$ (or $p0<x<p1$ and $p4<x<p5$) becomes equal to the pixel value of the first image 200.

That is, the image generating device 100 according to the first method may remove light noise from the first image 200 by synthesizing the first image 200 with a region of the second image 300 corresponding to the light noise region 203 of the first image 200.

FIG. 5 illustrates a graph for describing an example of a three-dimensional (3D) weight function.

Referring to FIG. 5, according to an embodiment, the image generating device 100 may obtain a 3D weight function z=f(x,y) on the basis of a weight function f(x) obtained along the horizontal axis of the first image 200 and a weight function f(y) obtained along the vertical axis of the first image 200.

The image generating device 100 may remove light noise from the first image 200 by synthesizing the first image 200 and the second image 300 according to the first method on the basis of the 3D weight function of z=f(x,y).

FIG. 6 is a diagram for describing a linear weight function and a sigmoid weight function.

Referring to FIG. 6, according to an embodiment, the image generating device 100 may determine a type of a weight function on the basis of a similarity between a light reflection region of a first image 200 and a light reflection region of a second image 300 (S105). Specifically, the image generating device 100 may determine a type of a weight function on the basis of a similarity between a pixel value of the light reflection region of the first image 200 and a pixel value of the light reflection region of the second image 300 (S105). For convenience of description, a method of determining a type of a weight function with respect to a weight function f(x) will be described below and may also apply to determining types of weight functions f(y) and f(x, y).

As shown in FIG. 5, the image generating device 100 may set a function value f(x) of a weight function to include a value between 0 and 1 at p1≤x≤p2 and p3≤x≤p4 (or p1<x<p2 and p3<x<p4) corresponding to the region between the boundary of the first synthesis region 204 and the boundary of the light noise region 203. In addition, the image generating device 100 may set p1≤x≤p2 and p3≤x≤p44 and set the weight function f(x) to include a linear function passing (p1,0) and (p2,1) and a linear function passing (p3,1) and (p4,0).

However, when a similarity between a pixel value distribution of the first image 200 and a pixel value distribution of the second image 300 used for a synthesis for removing light noise is low, a blur may occur in a synthetic image and thus information of text, a photograph, etc. included in an image may be unidentifiable when the weight function f(x) is set as a type of function including a linear function passing (p1,0) and (p2,1) and a linear function passing (p3,1) and (p4,0) (hereinafter referred to as a linear function) as shown in FIG. 5.

Specifically, because the image generating device 100 obtains the first image 200 and the second image 300 using the first and second lighting units 102A and 102B located at different positions, respectively, the pixel value distribution of the first image 200 and the pixel value distribution of the second image 300 may be different from each other.

According to an embodiment, when the weight function f(x) is a linear function having a value between 0 and 1 when p1≤x≤p2 and p3≤x≤p4, a pixel value F(x) of a synthetic image obtained by [Equation 1]=(pixel value of first image)*(1−f(x))+(pixel value of second image)*f(x) has a distribution having a low similarity with a pixel value distribution of a first image and a pixel value distribution of an image when p1≤x≤p2 and p3≤x≤p4. For example, when f(a)=0.7 at a point x satisfying p1≤x≤p2 and p3≤x≤p4 (x=a), F(a)=(pixel value of first image)*0.3+(pixel value of second image)*0.7 according to [Equation 1]represents a pixel value far different from the pixel value of the first image and the pixel value of the second image.

When the pixel value of the synthetic image is different from the pixel value distribution of the first image 200 and the pixel value distribution of the second image 300 and the number of pixels having such a pixel value is large, a blur is likely to occur in the synthetic image. A blur in an image causes a boundary of a photograph and text included in the image to be unclear and thus information of the photograph and the text is unidentifiable.

Therefore, when a similarity between the pixel value distribution of the first image 200 and the pixel value distribution of the second image 300 is low, the image generating device 100 may reduce the number of pixels having a pixel value F(x) far different from the pixel value of the first image 200 and the pixel value of the second image 300 and increase the number of pixels having a pixel value F(x) close to the pixel value of the first image 200 and the pixel value of the second image 300, thereby preventing the occurrence of blur.

The image generating device 100 according to an embodiment may set a sigmoid function as a weight function as illustrated in FIG. 6B when a similarity of a pixel value distribution of each of the first light noise region 203 and the light noise region 303 is low.

Specifically, when a weight function is determined to be a sigmoid weight function (hereinafter referred to as a sigmoid function) when p1≤x≤p2 and p3≤x≤p4 as illustrated in FIG. 8A when the similarity is low, a plurality of pixels of a synthetic image located at positions corresponding to p1≤x≤p1, pb≤x≤p2, p3≤x≤pc and pd≤x≤p4 may be substantially the same as original pixel values of the first image 200 or original pixel values of the second image 300, thereby preventing the occurrence of blur.

The image generating device 100 may obtain a similarity between a pixel value distribution of the light reflection region 203 of the first image 200 and a pixel value distribution of a region of the second image 300 located at a position corresponding to the light reflection region 203 of the first image 200 and determine a type of a weight function on the basis of the obtained similarity.

In addition, the image generating device 100 may determine a similarity in a pixel brightness distribution between the light reflection region 203 of the first image 200, an entire region of the first image 200, and an entire region of the second image 300 and determine a type of a weight function on the basis of the determined similarity.

Here, the pixel value distribution may be represented by a histogram. In this case, a horizontal axis of the histogram may represent a brightness level of each pixel and a vertical axis thereof may represent the number of pixels having a corresponding brightness level or a ratio of the number of pixels having the corresponding brightness level to the total number of pixels.

Here, the similarity may be represented by a correlation coefficient ranging from 0 to 1. In this case, 0 represents a low similarity and 1 may represent a high similarity.

The image generating device 100 according to an embodiment may determine a weight function as a linear function when the correlation coefficient is less than or equal to a predetermined first value. The image generating device 100 according to an embodiment may determine a weight function as a sigmoid function when the correlation coefficient is greater than the predetermined first value.

For example, the image generating device 100 may determine a weight function as a linear function when the correlation coefficient is in a range of 0 to 0.5.

In another embodiment, the image generating device 100 may determine a weight function as the linear function when the correlation coefficient is less than or equal to the predetermined first value. Alternatively, the image generating device 100 may determine a weight function as the sigmoid function when the correlation coefficient is greater than or equal to the predetermined first value and less than a predetermined second value. Alternatively, the image generating device 100 may determine a weight function as a tanh function when the correlation coefficient is greater than or equal to the predetermined second value.

Figure 7:
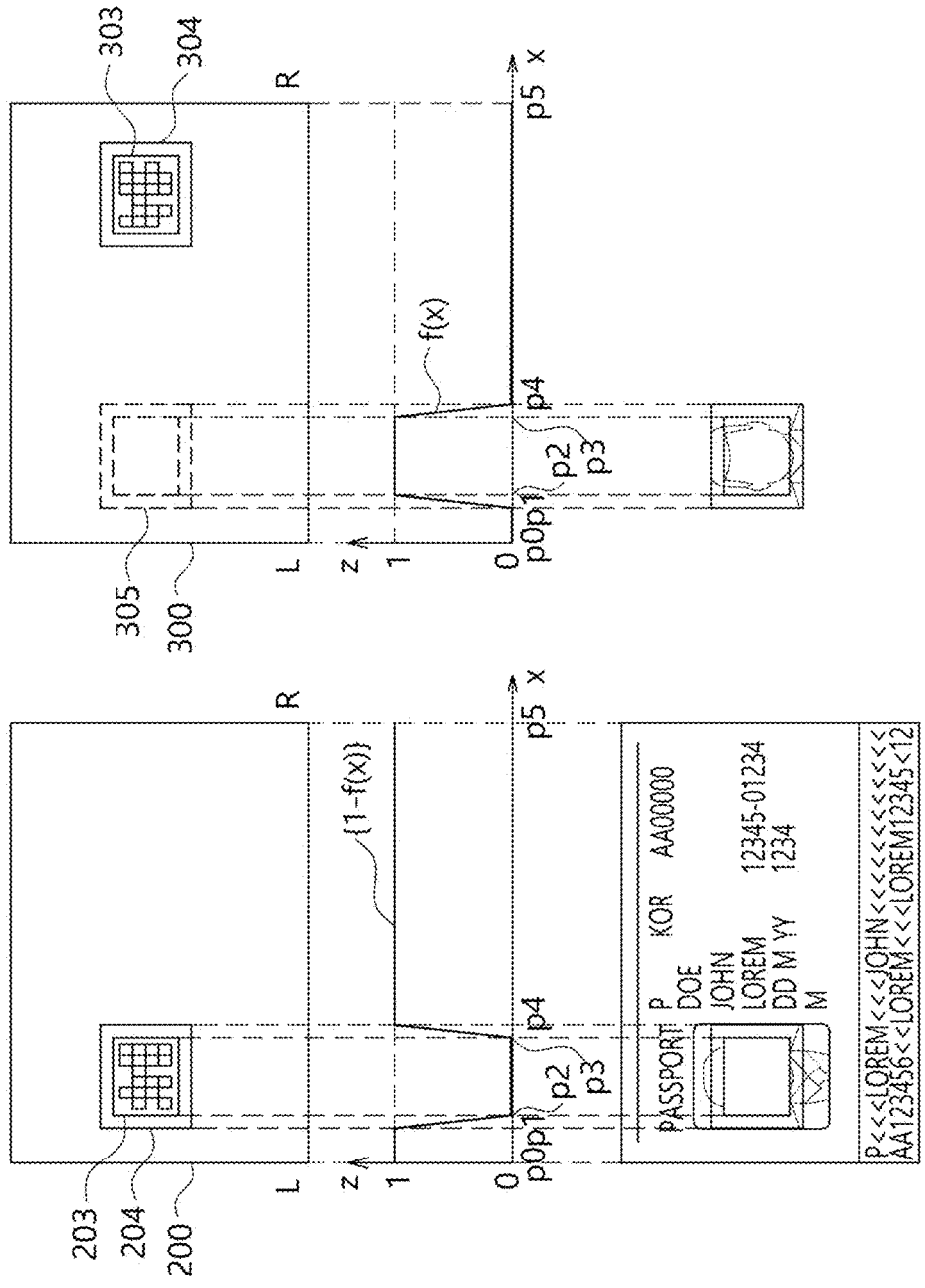
FIG. 7 is a diagram for describing synthesizing images using a weight function on the basis of the first method according to an embodiment.

FIG. 7 is a diagram for describing synthesizing images using a weight function based on the first method according to an embodiment.

Referring to FIG. 7, according to an embodiment, the image generating device 100 may remove light noise using an obtained weight function (S106).

Specifically, the image generating device 100 may obtain a synthetic image from which light noise of the first image 200 is removed by synthesizing the first image 200 and the second image 300 using an obtained weight function f(x) according to Equation 1 above. In this case, a pixel value of the synthetic image may be represented as F(x).

Specifically, the image generating device 100 may obtain a synthetic image from which light noise of the first image 200 is removed by synthesizing the first image 200 and the second image 300 using an obtained weight function f(y) according to Equation 2 below. In this case, the pixel value of the synthetic image may be represented as F(y).

$$F(y)=(1-f(y))*A+f(y)*B \quad \text{[Equation 2]}$$

Here, A may represent a pixel value of the first image 200 and B may represent a pixel value of the second image 300.

The image generating device 100 may remove light noise from the first image 200 by locally synthesizing the first image 200 and the second image 300 according to Equations 1 and 2.

In addition, the image generating device 100 may obtain a 3D weight function z=f (x, y) on the basis of the obtained weight function f(x) or f(y) and remove light noise from the first image 200 by locally synthesizing the first image 200 and the second image 300 using the obtained f(x,y) according to Equation 3 below.

$$F(x,y)=(1-f(x,y))*A+f(x,y)*B \quad \text{[Equation 3]}$$

Here, A represents a pixel value of the first image 200 and B represents a pixel value of the second image 300.

The weight function f(x), f(y) or f(x,y) applied to the light noise region 203 of the first image 200 has a value close to 1 at $p2 \leq x \leq p3$ and $p2 \leq y \leq p3$ (or $p2<x<p3$ and $p2<y<p3$) and thus a pixel value of the first image 200 is multiplied by a value close to 0 and a pixel value of the second image 300 is multiplied by a value close to 1. Thus, a region of a synthetic image corresponding to $p2 \leq x \leq p3$ and $p2 \leq y \leq p3$ (or $p2<x<p3$ and $p2<y<p3$) may be substantially the same as the original second image 300. In this case, the region of the second image 300 corresponding to $p2 \leq x \leq p3$ and $p2 \leq y \leq p3$ (or $p2<x<p3$ and $p2<y<p3$) may be a region in which light noise is not generated. That is, the light noise region 203 of the first image 200 is replaced by a corresponding region 305 of the second image 300 located at a position corresponding to the light noise region 203, thereby removing light noise from the first image 200.

A certain ratio between a pixel value of the first image 200 and a pixel value of the second image 300 is reflected in a synthetic image corresponding to $p1 \leq x \leq p2$, $p3 \leq y \leq p4$, $p1 \leq y \leq p2$ and $p3 \leq y \leq p4$ (or $p1<x<p2$, $p3<s<p4$, $p1<y<p2$ and $p3<y<p4$), and thus the image generating device 100 may remove light noise through a more natural synthesis as described above.

The image generating device 100 may remove light noise from a second image according to the first method described above.

According to an embodiment, the image generating device 100 may obtain a third image on the basis of a left region of the first image 200 from which light noise is removed by the first method and a right region of the second image 300 from which light noise is removed by the first method.

Because the image generating device 100 obtains the first image 200 using the first lighting unit 102a located at the left side of the light receiving unit 101, the left region of the first image 200 may be brighter than the right region thereof even after light noise is removed therefrom by the first method.

In addition, because the image generating device 100 obtains the second image 300 using the second lighting unit 102b located at the right side of the light receiving unit 101, the right region of the second image 300 may be brighter than the left region thereof even after light noise is removed therefrom by the second method.

The image generating device 100 may obtain a third image having a uniform brightness level by synthesizing the left region of the first image 200 from which light noise is removed by the first method and the right region of the second image 300 from which light noise is removed by the first method and which has a brightness level similar to that of the left region of the first image 200.

The second method of removing light noise from an image through a global synthesis according to an embodiment will be described with reference to FIG. 8 below.

The image generating device 100 according to the second method may obtain a third image from which no light noise is generated by synthesizing a region of a first image 200 in which no light noise is generated and a region of a second image 300 in which no light noise is generated.

Specifically, because the first image 200 is obtained using the first lighting unit 102a located at the left side of the light receiving unit 101, light noise may not be generated in the right region of the first image 200. Otherwise, the amount of light noise generated in the right region of the first image 200 may be less than that of light noise generated in the left region of the first image 200.

Because the second image 300 is obtained using the second lighting unit 102b located at the right side of the light receiving unit 101, compared to a right region of the second image 300, no light noise or a small amount of light noise may be generated in a left region of the second image 300 according to the same principle.

Thus, the image generating device 100 according to the second method may obtain a third image in which no light noise or a relatively small amount of light noise is generated by synthesizing the right region of the first image 200 obtained by the first lighting unit 102a located at the left side of the light receiving unit 101 and the left region of the second image 300 obtained by the second lighting unit 102b located at the right side of the light receiving unit 101.

However, positions of the region of the first image 200 and the region of the second image 300 used for the synthesis according to the second method may vary according to the positions of the plurality of lighting units 102 and are not necessarily limited to the right region or the left region. For example, when two lighting units are positioned above and below the light receiving unit 101, an upper region or a lower region of an obtained image may be used for a synthesis.

Obtaining a first image (S101), obtaining a second image using a second lighting unit (S102), and extracting a light noise region from the first and second images (S103) according to the first method may also apply to a method of generating an image from which light noise is removed according to the second method. Setting a synthesis region on the basis of a light noise region (S104) is not included in the second method, and thus, determining a weight function for a synthesis (S105) and removing light noise region using the weight function according to the second method will be described below (S106).

Figure 8:
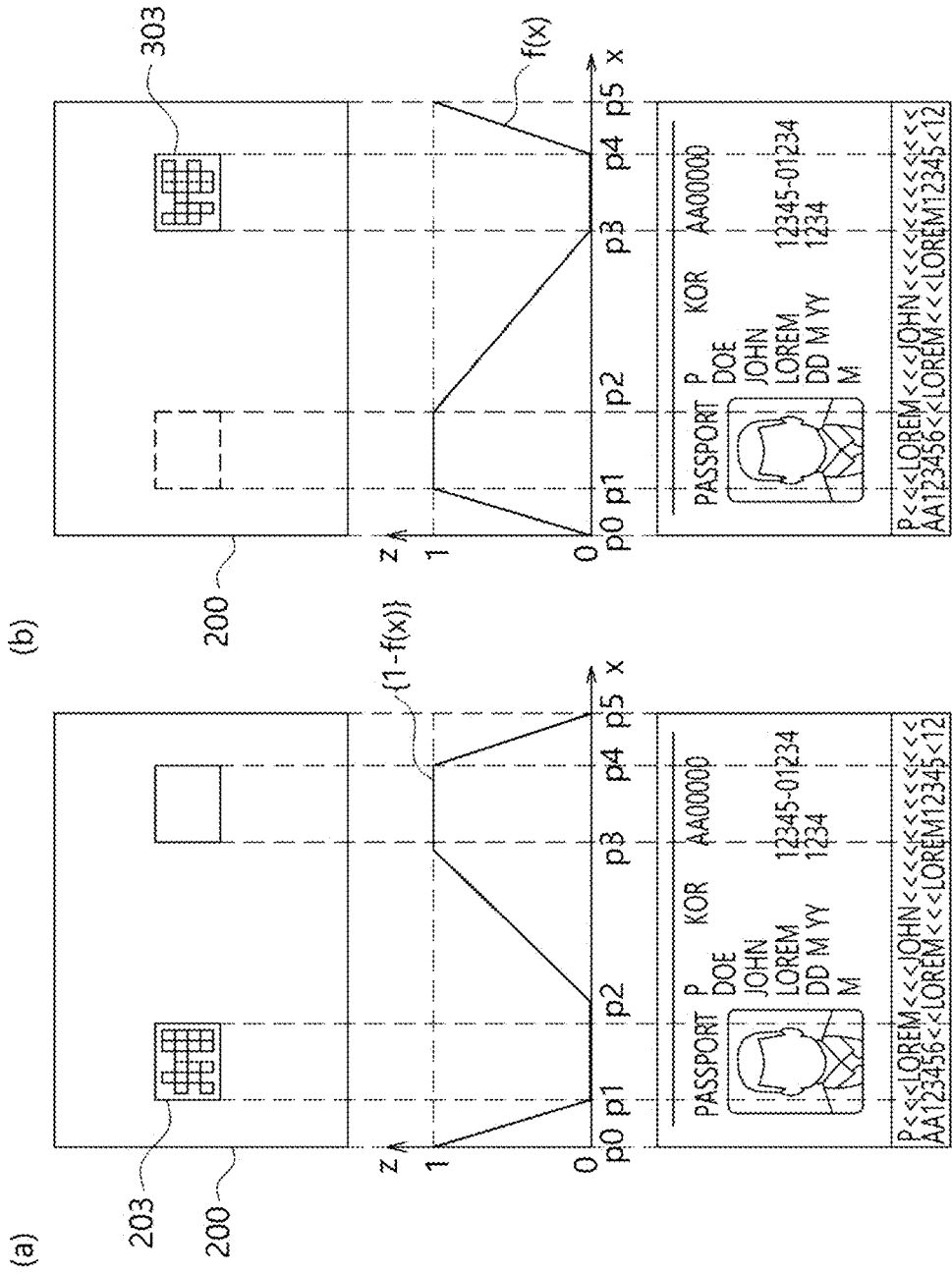
FIG. 8 is a diagram for describing synthesizing images using a weight function on the basis of a second method according to an embodiment.

Referring to FIG. 8, according to an embodiment, in determining a weight function for a synthesis, the image generating device 100 according to the second method may set a weight function $f(x)$ on the basis of a first light noise region 203 of the first image 200 and a second light noise region 303 of the second image 300. In this case, an x-axis of the weight function $f(x)$ may represent the positions of pixels on the horizontal axis of the first image 200. A z-axis of the weight function $f(x)$ may represent a function value of the weight function $f(x)$.

In this case, the image generating device 100 according to the second method may obtain weight functions $f(y)$ and $f(x, y)$, similar to the image generating device 100 according to the first method. In addition, the image generating device 100 according to the second method may generate an image from which light noise is removed on the basis of weight functions $f(y)$ and $f(x, y)$.

Referring to FIG. 8, according to an embodiment, boundaries of first and second images may be marked as p0 and p5 on an x-axis of a weight function. A boundary of the first light noise region 203 may be marked as p1 and p2 on the x-axis of the weight function. A boundary of the second light noise region 303 may be marked as p3 and p4 on the x-axis of the weight function.

The image generating device 100 may set a function value $f(x)$ of the weight function to include a value between 0 and 1 at p0≤x≤p1, p2≤x≤p3 and p4≤x≤p5 (or p0<x<p1, p2<x<p3 and p4<x<p5) corresponding to a region in which light noise is not generated.

As will be described below in detail with respect to operation S106 of removing light noise using a weight, a function $F(x)$ representing a pixel value of a synthetic image obtained using the weight function $f(x)$ may have a value according to Equation 4 below.

$$F(x)=(1-f(x))*A+f(x)*B \qquad \text{[Equation 4]}$$

Here, A represents a pixel value of the first image 200 and B represents a pixel value of the second image 300.

Thus, the image generating device 100 may determine a weight function such that a pixel value of the first image 200 corresponding to p0≤x≤p1, p2≤x≤p3 and p4≤x≤p5 (or p0<x<p1, p2<x<p3 and p4<x<p5) is multiplied by a weight of $1-f(x)$ greater than 0 and less than 1 to reflect the pixel value of the first image 200 in a pixel value of a synthetic image at a ratio less than 1. In this case, a weight function may be determined such that a pixel of the second image 300 corresponding to p0 p2≤x≤p3 and p4≤x≤p5 (or p0<x<p1, p2<x<p3 and p4<x<p5) is multiplied by a weight $f(x)$ greater than 0 and less than 1 to reflect the pixel value of the second image 300 in a pixel value of a synthetic image at a ratio less than 1.

The image generating device 100 may set the function value $f(x)$ of the weight function to include 1 at p1≤x≤p2 (or p1<x<p2) corresponding to the light noise region 203.

Thus, the image generating device 100 may multiply a pixel value of the first image 200 corresponding to p1≤x≤p2≤x≤p3 (or p1<x<p2) by a weight $1-f(x)=0$ (∵ $f(x)=1$). Alternatively, the image generating device 100 may multiply the pixel value of the first image 200 corresponding to p1≤x≤p2≤x≤p3 (or p1<x<p2) by a weight $f(x)=1$. Therefore, the image generating device 100 may set a weight function such that a pixel value of a synthetic image located at p1≤x≤p2≤x≤p3 (or p1<x<p2) becomes equal to the pixel value of the first image 200.

The image generating device 100 may set the function value $f(x)$ of the weight function to include 0 at p3≤x≤p4 (or p3<x<p4) corresponding to the light noise region 203.

Thus, the image generating device 100 may multiply a pixel value of the first image 200 corresponding to p3≤x≤p4 (or p3<x<p4) by a weight $1-f(x)=1$ (∵ $f(x)=0$). Alternatively, the image generating device 100 may multiply the pixel value of the first image 200 corresponding to p3≤x≤p4 (or p3<x<p4) by a weight $f(x)=0$. Therefore, the image generating device 100 may set a weight function such that a pixel value of a synthetic image located at p3≤x≤p4 (or p3<x<p4) becomes equal to a pixel value of the second image 300.

Referring to FIG. 8, according to an embodiment, the image generating device 100 may remove light noise using the obtained weight function (S106).

Specifically, the image generating device 100 may obtain a synthetic image from which light noise is removed by synthesizing the first image 200 and the second image 300 using an obtained weight function $f(x)$ according to Equation 4 above. In this case, a pixel value of the synthetic image may be represented as $F(x)$.

In addition, the image generating device 100 may obtain a 3D weight function $z=f(x, y)$ on the basis of the obtained weight function $f(x)$ or $f(y)$, and remove light noise from the first image 200 by locally synthesizing the first image 200 and the second image 300 using an obtained $f(x,y)$ according to Equation 3 below.

Therefore, the image generating device 100 according to the second method may remove light noise from the first image 200 by replacing the first image 200 with the second image 300 located at a position corresponding thereto and remove light noise from the second image 300 by replacing the second image 300 with the first image 200 located at a position corresponding thereto.

Although FIG. 8 illustrates only the weight function $f(x)$, the image generating device 100 according to the second method may also set a weight function $f(y)$ along a vertical axis of an image as illustrated in FIG. 5 according to the first method and remove light noise from an image according to Equation 5 below.

$$F(y)=(1-f(y))*A+f(y)*B \qquad \text{[Equation 5]}$$

Here, A represents a pixel value of the first image 200 and B represents a pixel value of the second image 300.

In addition, the image generating device 100 according to the second method may obtain a 3D weight function $z=f(x,y)$ on the basis of a weight function $f(x)$ and a weight function $f(y)$ obtained along a horizontal axis and a vertical axis of the first image 200, respectively, and remove light noise from an image according to Equation 6 below.

$$F(x,y)=(1-f(x,y))*A+f(x,y)*B \qquad \text{[Equation 6]}$$

Here, A represents a pixel value of the first image 200 and B represents a pixel value of the second image 300.

FIG. 9 is a diagram for describing a linear weight function and a sigmoid weight function according to the second method.

Referring to FIG. 9, according to an embodiment, the image generating device 100 may determine a type of a weight function on the basis of a similarity between a light reflection region 200 of a first image 200 and a light reflection region 200 of a second image 200 (S105).

As shown in FIG. 8, according to an embodiment, the image generating device 100 may set a function value f(x) of a weight function to include a value between 0 and 1 at $p0 \leq x \leq p1$, $p2 \leq x \leq p3$ and $p4 \leq x \leq p5$ (or $p0<x<p1$, $p2<x<p3$ and $p4<x<p5$) corresponding to a region between a boundary of the first image 200 and a boundary of the first light noise region 203, a region between the boundary of the first light noise region 203 and a boundary of a second light noise region 303, and a region between the boundary of the second light noise region 303 and the boundary of the second image 300. Alternatively, the image generating device 100 may set the weight function f(x) to include a linear function passing (p0,1) and (p1,0), a linear function passing (p2,0) and (p3,1), and a linear function passing (p4,1) and (p5,0) when $p0 \leq x \leq p1$, $p2 \leq x \leq p3$ and $p4 \leq x \leq p5$ (or $p0<x<p1$, $p2<x<p3$ and $p4<x<p5$).

However, when the weight function f(x) is set as a type of function always including a linear function (hereinafter referred to as a linear function) when $p0 \leq x \leq p1$, $p2 \leq x \leq p3$ and $p4 \leq x \leq p5$ (or $p0<x<p1$, $p2<x<p3$ and $p4<x<p5$), a blur may occur in a synthetic image according to the same principle as in a case in which a blur occurs in an image as described above with respect to the first method and thus information of text, a photograph, etc. included in an image may be unidentifiable. Therefore, in order to solve this problem, the image generating device 100 may determine a type of weight function based on a similarity of the first image 200 and the second image 300.

In addition, the image generating device 100 may determine a similarity in a pixel brightness distribution between the light reflection region 203 of the first image 200, an entire region of the first image 200, and an entire region of the second image 300 and determine a type of a weight function on the basis of the determined similarity.

Here, the pixel brightness distribution may be represented by a histogram. In this case, a horizontal axis of the histogram may represent a brightness level of each pixel and a vertical axis thereof may represent the number of pixels having a corresponding brightness level or a ratio of the number of pixels having the corresponding brightness level to the total number of pixels.

Here, the similarity may be represented by a correlation coefficient ranging from 0 to 1. In this case, 0 represents a low similarity and 1 may represent a high similarity.

The image generating device 100 according to an embodiment may determine a weight function as a linear function when the correlation coefficient is less than or equal to a predetermined first value. The image generating device 100 may determine a weight function as a sigmoid function when the correlation coefficient is greater than the predetermined first value.

For example, the image generating device 100 may determine a weight function as a linear function when the correlation coefficient is in a range of 0 to 0.5.

In another embodiment, the image generating device 100 may determine a weight function as the linear function when the correlation coefficient is less than or equal to the predetermined first value. Alternatively, the image generating device 100 may determine a weight function as the sigmoid function when the correlation coefficient is greater than or equal to the predetermined first value and less than a predetermined second value. Alternatively, the image generating device 100 may determine a weight function as a tanh function when the correlation coefficient is greater than or equal to the predetermined second value.

Methods according to embodiments may be embodied in the form of program instructions executable through various computer means and recorded on a computer-readable recording medium. The computer-readable recording medium may include program instructions, data files, data structures, and the like alone or in combination. The program instructions recorded on this medium may be specially designed and configured for embodiments or may be well-known and available to those of ordinary skill in the field of computer software. Examples of the computer-readable recording medium include magnetic media such as hard disks, floppy disks, and magnetic tapes, optical media such as CD-ROMs and DVDs, magneto-optical media such as floptical disks, and hardware devices, such as ROMs, RAMs, and flash memory, which are specifically configured to store and execute program instructions.

Examples of the program instructions include not only machine code generated by a compiler but also high-level language code executable by a computer using an interpreter or the like. The above-described hardware device may be configured to operate as at least one software module to perform operations of embodiments and vice versa.

According to an embodiment of the present disclosure, a method and device for extracting an image of a region of an image in which light noise is generated may be provided.

According to an embodiment of the present disclosure, a method and device for obtaining an image synthesis region to naturally remove light noise from an image by synthesizing images may be provided.

According to an embodiment of the present disclosure, a method and device for obtaining a weight to be used to naturally remove light noise from an image by synthesizing images can be provided.

Although embodiments have been described above in conjunction with the limited number of embodiments and the drawings, various modifications and modifications can be made from the above description by those of ordinary skill in the art. For example, an appropriate result is achievable even when the above-described techniques are performed in a different order than that that described herein and/or when the components of the systems, structures, devices, circuits, and the like described herein are coupled to or combined with each other in a different form than that described herein or replaced or substituted with other components or equivalents. Therefore, other implementations, other embodiments, and equivalents to the claims are also within the scope of the claims described below.

What is claimed is:

1. A device for generating an image, the device comprising:
   a first lighting unit configured to emit light to an object;
   a second lighting unit configured to emit light to the object and located at a position different from a position of the first lighting unit;
   a light receiver configured to receive light reflected from the object when light is emitted to the object from the first lighting unit or the second lighting unit; and
   an image processor configured to obtain image data based on the light received by the light receiver and process the obtained image data,
   wherein the image processor obtains a first image based on light reflected from the object when light is emitted from the first lighting unit, obtains a second image based on light reflected from the object when light is emitted from the second lighting unit, generates a processed image using the first image and the second image to correct a pixel value of at least one of a first light noise region of the first image due to the light emitted from the first lighting unit or a second light noise region of the second image due to the light emitted from the second lighting unit, wherein the processor, to generate the processed image, obtains a similarity between the first image and the second image, determines a weight function for synthesizing the first image and the second image on the basis of the similarity, a boundary of a region of the first image, and a boundary of a region of the second image and generates the processed image by synthesizing the first image and the second image on the basis of the weight function; and wherein the weight function includes a linear function when a value obtained based on the similarity is less than or equal to a predetermined value and the weight function includes a sigmoid function when the value obtained based on the similarity is greater than the predetermined value.

2. The device of claim 1, wherein the first lighting unit and the second lighting unit are located at symmetrical positions with respect to the light receiver.

3. The device of claim 1, further comprising an object accommodation unit configured to accommodate the object,
wherein the first light noise region is generated due to light emitted from the first lighting unit to a first region of the object accommodation unit,
wherein the second light noise region is generated due to light emitted from the second lighting unit to a second region of the object accommodation unit, and
wherein a distance between the first lighting unit and the first region is shorter than a distance between the first lighting unit and the second region, and a distance between the second lighting unit and the second region is shorter than a distance between the second lighting unit and the first region.

4. The device of claim 1, wherein the image processor obtains a first synthesis region including the first light noise region on the based on the first light noise region, and determines the weight function for generating the processed image on the basis of the similarity, a boundary of the first light noise region, and a boundary of the first synthesis region.

5. The device of claim 4, wherein the image processor obtains a similarity between the first light noise region of the first image and the second light noise region of the second image.

6. The device of claim 5, wherein the image processor obtains a similarity between a first region of the first image, which does not include the first light noise region, and a second region of the second image, which does not include the second light noise region.

7. The device of claim 1, wherein the region of the first image does not include the first light noise region and the region of the second image does not include the second light noise region.

8. The device of claim 7, wherein the image processor obtains the weight function based on the similarity, a boundary of the first light noise region, and a boundary of the second light noise region.

9. The device of claim 1, wherein
the light receiver obtains image data including a pixel value on the basis of the reflected light and transmits the image data to the image processor, and
the image processor obtains an image on the basis of the obtained image data.

10. The device of claim 1, wherein the light receiver obtains first image data including a pixel value on the basis of light emitted to the object from the first lighting unit and transmits the first image data to the image processor, and obtains second image data including a pixel value on the basis of light emitted to the object from the second lighting unit and transmits the second image data to the image processor, and the image processor obtains the processed image on the basis of the first image data and the second image data.

11. The device of claim 10, wherein the light receiver obtains first sub-image data corresponding to a predetermined first subregion of the object among the first image data and transmits the first sub-image data to the image processor when the first image data is obtained, and obtains second sub-image data corresponding to a predetermined second subregion of the object among the second image data and transmits the second sub-image data to the image processor when the second image data is obtained, and
the image processor obtains the processed image on the basis of the first sub-image data and the second sub-image data.

12. A method for generating an image, the method comprising:
emitting light to an object using a first lighting unit;
emitting light to the object using a second lighting unit disposed at a position different from a position of the first lighting unit;
obtaining a first image based on light reflected from the object when the light is emitted from the first lighting unit;
obtaining a second image based on light reflected from the object when the light is emitted from the second lighting unit;
obtaining a similarity between the first image and the second image;
determining a weight function for synthesizing the first image and the second image on the basis of the similarity, a boundary of a region of the first image, and a boundary of a region of the second image, wherein the weight function includes a linear function when a value obtained based on the similarity is less than or equal to a predetermined value and the weight function includes a sigmoid function when the value obtained based on the similarity is greater than the predetermined value; and
generating a processed image by synthesizing the first image and the second image using the weight function to correct a pixel value of at least one of a first light noise region of the first image due to the light emitted from the first lighting unit or a second light noise region of the second image due to the light emitted from the second lighting unit.

13. A non-transitory computer-readable storage medium including a computer program implemented to execute the method of claim 12.

* * * * *